United States Patent
Brown

(10) Patent No.: US 8,340,688 B2
(45) Date of Patent: Dec. 25, 2012

(54) METHOD AND APPARATUS FOR FINDING PEOPLE VIA A MOBILE DEVICE

(75) Inventor: William A. Brown, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 279 days.

(21) Appl. No.: 12/628,825

(22) Filed: Dec. 1, 2009

(65) Prior Publication Data

US 2011/0130155 A1   Jun. 2, 2011

(51) Int. Cl.
*H04W 24/00* (2009.01)
(52) U.S. Cl. .................................. 455/456.2; 455/456.3
(58) Field of Classification Search .... 455/456.1–456.6, 455/517–519, 457, 414.1, 418–420, 459
See application file for complete search history.

(56) References Cited

U.S. PATENT DOCUMENTS

| | | | |
|---|---|---|---|
| 7,203,674 B2 * | 4/2007 | Cohen | 1/1 |
| 7,545,784 B2 * | 6/2009 | Mgrdechian et al. | 370/338 |
| 7,801,542 B1 * | 9/2010 | Stewart | 455/518 |
| 7,899,468 B2 * | 3/2011 | Lohtia et al. | 455/456.1 |
| 2007/0282621 A1 * | 12/2007 | Altman et al. | 705/1 |
| 2008/0036653 A1 * | 2/2008 | Huston | 342/357.07 |

* cited by examiner

*Primary Examiner* — Brandon Miller

(57) ABSTRACT

A method, computer readable medium and apparatus for finding at least one person are disclosed. For example, the method receives a request from a subscriber to find at least one person having at least one characteristic predefined by the subscriber, receives a location of the subscriber and finds, via a processor, the at least one person having the at least one characteristic predefined by the subscriber near the location of the subscriber.

20 Claims, 4 Drawing Sheets

METHOD AND APPARATUS FOR FINDING PEOPLE VIA A MOBILE DEVICE

BACKGROUND

People are increasingly connected via social networks. People opt into or voluntarily join various online social networks to share thoughts, common interests and media. When people are on their computers, they can generally see when people within their social networks are also connected online.

However, when people leave their homes and travel to various locations, they may not realize that people within their social networks are nearby. Some people may desire to know when friends, family or people within their social network are within or near a current location, even if they do not see them or know that they were coming to or near the current location.

SUMMARY

In one embodiment, the present disclosure teaches a method, a computer readable medium and an apparatus for finding at least one person are disclosed. For example, the method receives a request from a subscriber to find at least one person having at least one characteristic predefined by the subscriber, receives a location of the subscriber and finds, via a processor, the at least one person having the at least one characteristic predefined by the subscriber near the location of the subscriber.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, a computer readable medium and an apparatus for finding at least one person. Although the present disclosure is discussed below in the context of IP Multimedia Subsystem (IMS) networks, the present disclosure is not so limited. Namely, the present disclosure can be applied to packet networks in general, e.g., Voice over Internet Protocol (VoIP) networks, Service over Internet Protocol (SoIP) networks, wireless networks, and the like.

Figure 1:
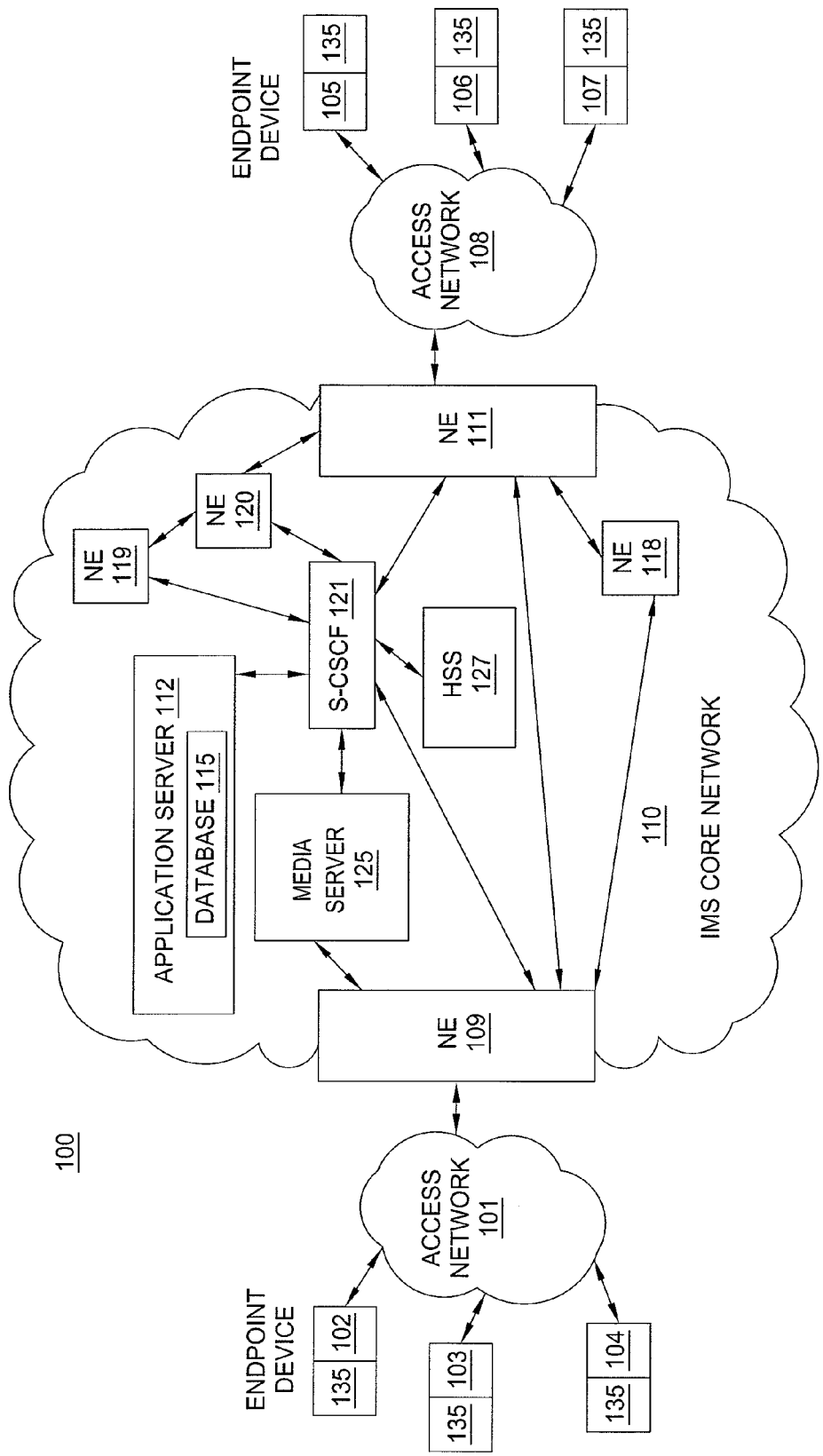
FIG. 1 illustrates an exemplary network related to the present disclosure.

To better understand the present disclosure, FIG. 1 illustrates an example network 100, e.g., an IMS network related to the present disclosure. An IP network is broadly defined as a network that uses Internet Protocol to exchange data packets. Exemplary IMS networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. In addition, a plurality of endpoint devices 105-107 are configured for communication with the IMS core packet network 110 via an access network 108. The network elements 109 and 111 may serve as gateway servers or edge routers for the network 110.

In one embodiment, the endpoint devices 102-107 may comprise mobile customer endpoint devices such as wireless telephones, smart phones, laptop computers, Personal Digital Assistants (PDAs), and the like. Each one of the endpoint devices 102-107 may be coupled to a location tracking device 135. For example, the location tracking device may be a GPS transmitter or a simply a transmitter that emits a signal that can be used by the network 100 for triangulating the location. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a media server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g. various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server (AS) 112 may comprise any server or computer that is well known in the art, and the database 115 may be any type of electronic collection of data that is also well known in the art. In one embodiment, the AS 112 may store personal information or characteristics associated with each subscriber of the respective endpoint devices 102-107. In addition, one or more AS 112 may be included in the communication system 100. Those skilled in the art will realize that the communication system 100 may be expanded by including additional endpoint devices, access networks, network elements, application servers, etc. without altering the scope of the present disclosure.

The above IP network is described to provide an illustrative environment in which packets for voice, data and multimedia services are transmitted on networks. The current disclosure discloses a method and apparatus for finding at least one person using an example network illustrated in FIG. 1 and as described above.

Figure 2:
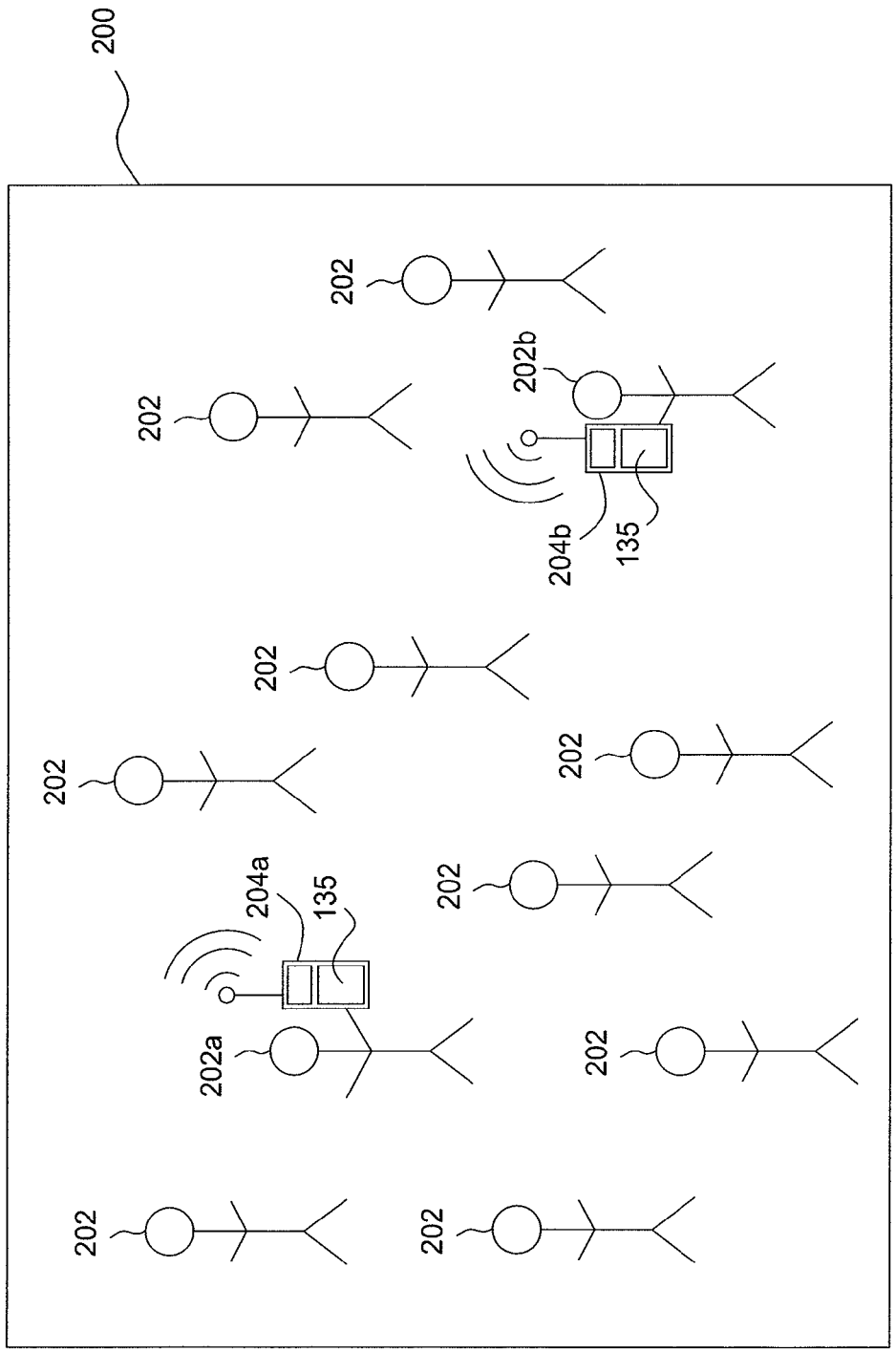
FIG. 2 illustrates a high level block diagram of the present disclosure.

FIG. 2 illustrates a high level block diagram of a location 200 where a subscriber is attempting to find at least one person. In one embodiment the location 200 may be an establishment (e.g. a restaurant, a retail store, a bar), a social gathering place (e.g., a sports arena, a theater, an outdoor park) or a geographical location (e.g. a city, a township, a borough) and the like.

Within the location 200, there may be a plurality of persons 202. However, among the plurality of persons 202 there is a subscriber 202a and at least one person 202b that the subscriber 202a may be looking for. In order for the subscriber 202a to find the at least one person 202b, both the subscriber 202a and the at least one person 202b must subscribe to or opt into a service that allows other people to find them.

For example, in one embodiment, the subscriber 202a initially collects personal information or characteristics about the subscriber 202a. Personal information or characteristics includes, for example, physical information (e.g., height, weight, hair color, sex, eye color), associations (e.g. fraternities, sororities, charitable organizations, trade associations), personal hobbies, personal interests, characteristics the subscriber 202a finds attractive, etc. This information is provided by the subscriber 202a via an interface (e.g. via a graphical user interface, via the web, via a phone call, and the like).

Referring back to FIG. 1, the information provided by the subscriber 202a is stored in the network 100. For example, the application server 112 in the IMS core network 110 may store the information. Alternatively, a local server (not shown) within the access network 101 or the access network 108 may store the information.

This process of providing personal information or characteristics is repeated for each person 202 that decides to subscribe to a service for finding people. For example, the at least one person 202b is also subscribed to the service for finding people and has provided personal information and characteristics to the network.

After the subscriber 202a provides their personal information or characteristics to the network, the subscriber 202a can send a request to the network to find at least one person having at least one characteristic predefined by the subscriber. For example, the subscriber 202a may want the network to find a person that was in the same fraternity as the subscriber 202a. The predefined characteristics can be more specific such as a female, who enjoys watching movies and is a member of IEEE. The predefined characteristics can be even more specific, such as a specific person. For example, the subscriber 202a may want to find Jane Doe.

After the subscriber 202a sends the request to the network, the network receives a location of the subscriber 202a. For example, the network receives the location via a GPS transmitter 135 on a mobile endpoint device 204a of the subscriber 202a. Notably, any method for providing the subscriber's location may be used, e.g., triangulation, directly asking the subscriber 202a for their location, etc.

Based upon the location information received, the network determines that the subscriber 202a is at location 200. For example, the location 200 may be a local bar and the subscriber 202a may be visiting the area looking for someone to talk to. The network attempts to find at least one person (e.g., person 202b) that has personal information or characteristics stored with the network as a subscriber that matches the predefined characteristics in the request of subscriber 202a.

In one embodiment, the network identifies one or more different subscribers in the location 200. In other words all the people at location 200 may not be subscribers. Thus, the network only attempts to find people that are subscribers of the service to find at least one person.

Alternatively, the network may identify one or more different subscribers nearby the location 200. For example, the subscriber 202a may predefine a range to search for people. In other words, the subscriber 202a may request the network to find at least one person in a predefined location or a predefined range (e.g. within a radius of 1 mile of the subscriber's location).

As illustrated in FIG. 2, the network detects the location of a mobile endpoint device 204b that belongs to a person 202b that matches the at least one characteristics predefined by the subscriber 202a. As a result, the network sends a notification to the mobile endpoint device 204a of the subscriber 202a.

In one embodiment, the notification is a visual display on the mobile endpoint device 204a of the subscriber 202a. For example, the visual display may show a geographical map with a marker of where the person 202b is located relative to the location of the subscriber 202a. As a result, if multiple people are found, the visual display may show a marker for each person on the geographical map relative to the location of the subscriber 202a. Moreover, the display may track the movements of the subscriber 202a and the subscriber 202b as they move around in or near the location.

In one embodiment, the location of the subscriber 202a may be provided to the network on a periodic basis. For example, every ten minutes, every 30 minutes, every day and the like. As a result, when the subscriber 202a moves to another location, the network will automatically know which location to find at least one person in accordance with the request of the subscriber 202a.

In other words, once the subscriber 202a sends a request having at least one characteristic that is predefined by the subscriber 202a the network may continuously attempt to find at least one person that matches the characteristics predefined by the subscriber 202a. As a result, as the subscriber 202a roams around a city, the network may continuously send updated notifications to the mobile endpoint device 204a of the subscriber 202a.

In one embodiment, the subscriber 202a may be notified if no person are found that match the at least one characteristic defined by the subscriber 202a. As a result, the subscriber may be prompted to change the at least one characteristic or cancel their request to find at least one person.

As a result, the present disclosure allows a subscriber to be automatically notified or automatically find old friends when they are nearby. As a result, old friends or people within a subscriber's social network may be able to re-connect with old friends or people within a subscriber's social network without planning if both happen to be nearby each other's location.

However, on the chance that some subscribers may abuse the service feature or some subscriber may want to avoid unwanted harassment, the subscribers may also be provided an option to only allow specific users to find them. For example, subscriber 202b may define a list of ten friends within their social network that may find them using the service for finding at least one person. As a result, even if the subscriber 202b matches at least one characteristic of a request submitted by the subscriber 202a, the network will only provide a notification to the subscriber 202a of the presence of subscriber 202b if the subscriber 202a is on the list of ten friends defined by the subscriber 202b. It should be noted that other security mechanisms may be implemented. For example, the network may notify the subscriber 202b that they match a find request of subscriber 202a and ask if the network has permission to provide their location information to subscriber 202a.

Figure 3:
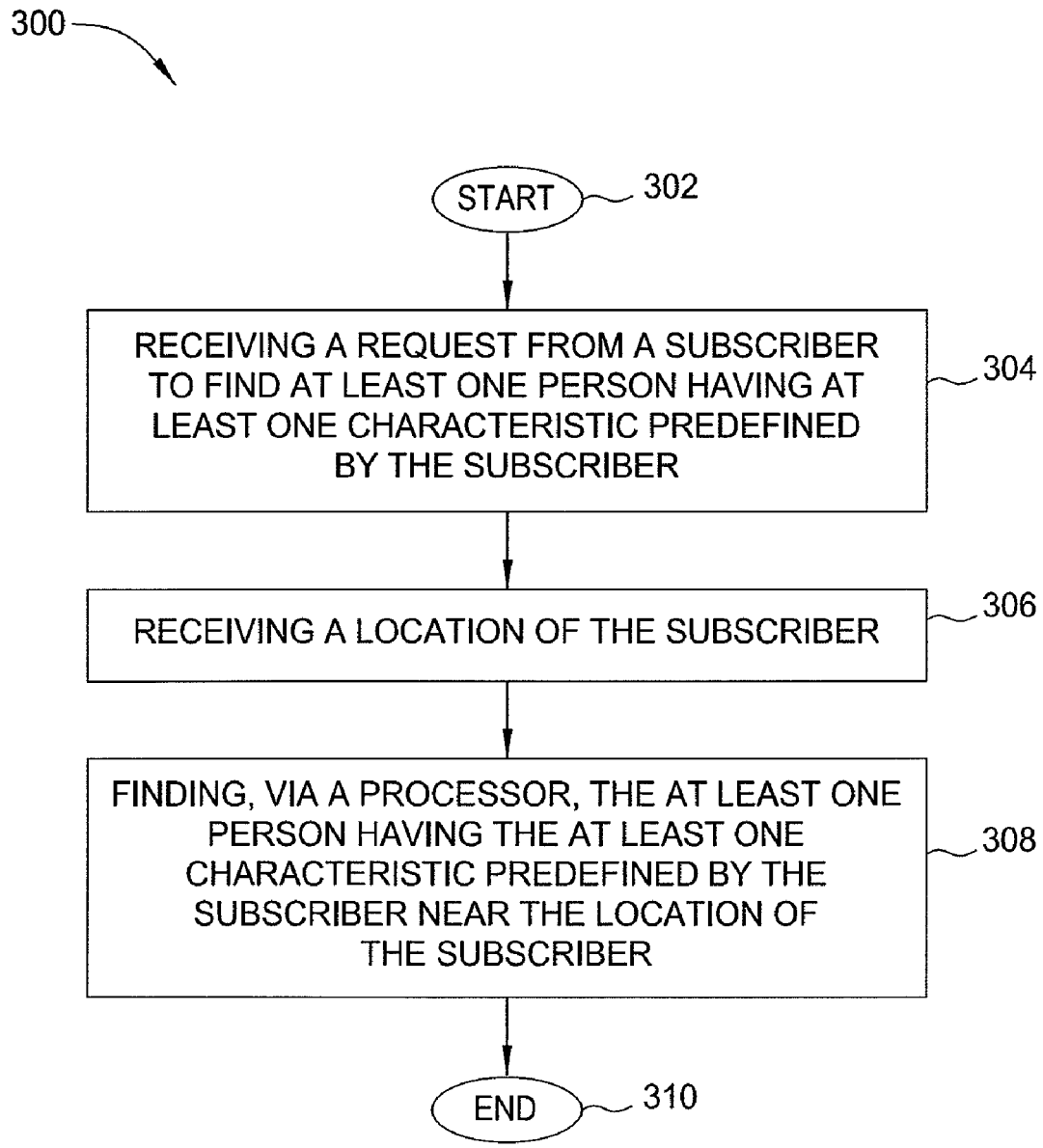
FIG. 3 illustrates a flowchart of a method for finding at least one person.

FIG. 3 illustrates a flowchart of a method 300 for finding at least one person. In one embodiment, one or more steps of the method 300 may be implemented by the application server 112 or a general purpose computer having a processor, a memory and input/output devices as illustrated below in FIG. 4.

The method 300 begins at step 302. At step 304, the method 300 receives a request from a subscriber to find at least one person having at least one characteristic predefined by a subscriber. As noted above, before the subscriber sends the request, the subscriber signs up for the service to find at least one person and submits personal information and characteristics to be stored in the network.

After the subscriber signs up for the service to find at least one person, the subscriber may send a request, e.g. to an application server in the communication network via the subscriber's mobile endpoint device. As discussed above, the request may include at least one characteristic predefined by a subscriber, e.g., find a person being part of lambda lambda lambda sorority, find a person that is a member of IEEE, to find a female having blond hair and blue eyes, and the like.

At step 306, the method 300 receives a location of the subscriber. For example, the subscriber's mobile endpoint device may be equipped with a GPS transmitter. In one embodiment, the network may receive the location of the subscriber via the GPS transmitter. However, it should be noted that other means may be used to obtain the location of the subscriber, e.g., triangulation by nearby cell towers, asking the subscriber for their location, and the like.

At step 308, the method 300 finds, via a processor, the at least one person having the at least one characteristic predefined by the subscriber near the location of the subscriber. The term "near" is defined as a predefined range or a predefined location. For example, the subscriber may predefine a range by requesting to find a person within a one mile radius of the subscriber's current location. The subscriber may predefine a location by requesting to find a person at the same establishment that the subscriber is currently visiting, e.g., a restaurant, an arena or a bar.

In one embodiment, to find the person, the method 300 identifies one or more different subscribers near the location of the subscriber. In other words, the method 300 first determines who is at the location. From all of the detected people at the location, the method 300 further determines those people who are also subscribed to the service to find at least one person. The method then receives the personal information of the one or more different subscribers near the location of the subscriber. For example, an application server in the network may store the personal information or characteristics of the one or more different subscribers that are identified at the location of the subscriber. Then the method 300 matches the at least one characteristic predefined by the subscriber with at least one characteristic in the personal information of at least one of the one or more different subscribers.

As discussed above, if a match is found, the method 300 may notify the subscriber via the subscriber's mobile endpoint device. The notification may be a visual display on the subscriber's mobile endpoint device, e.g., a geographical map with markers displaying where the people are relative to the subscriber's location.

In addition, the method 300 may be performed continuously on a periodic basis. For example, the method 300 may be automatically performed each time the network receives a new location of the subscriber or may be automatically performed every thirty minutes as people leave and enter the subscriber's location. The method 300 ends at step 310.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application.

Figure 4:
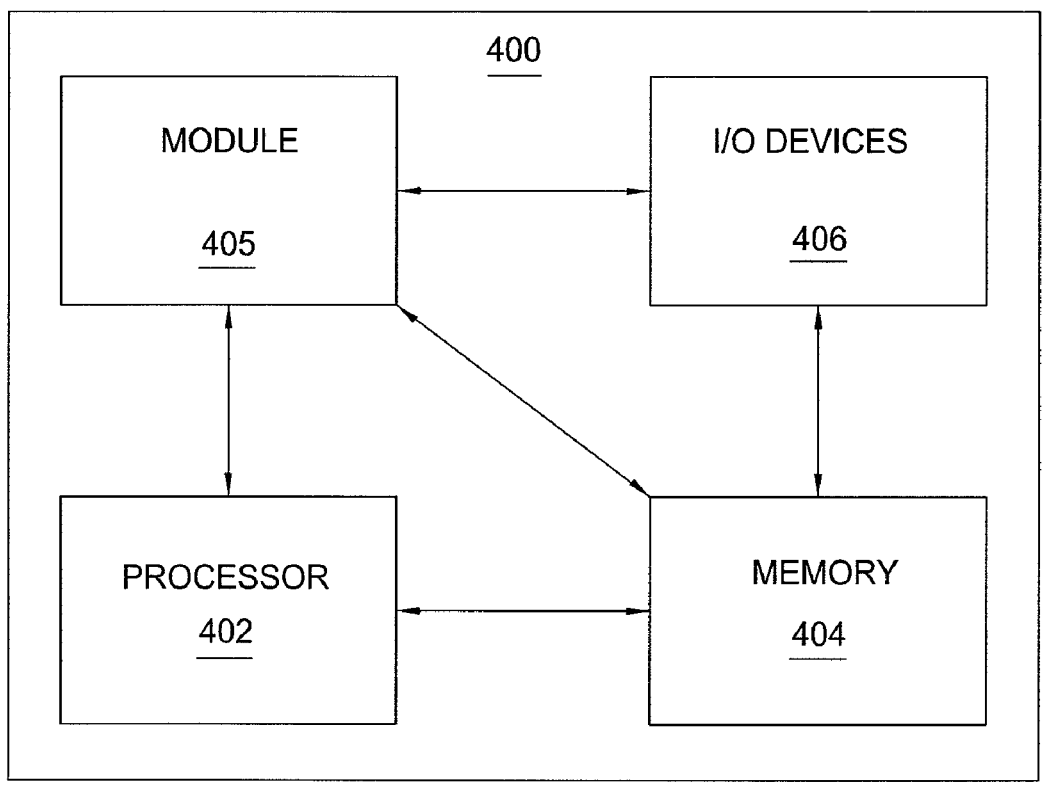
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for finding at least one person, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for finding at least one person can be loaded into memory 404 and executed by processor 402 to implement the functions as discussed above. As such, the present method 405 for finding at least one person (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method for finding a person, comprising:
receiving, via at least one processor, a request from a subscriber to find the person having a characteristic predefined by the subscriber;
receiving, via the at least one processor, a location of the subscriber;
finding, via the at least one processor, the person having the characteristic predefined by the subscriber within a range of the location of the subscriber if the subscriber is in a list of friends predefined by the person; and notifying, via the at least one processor, the subscriber that the person was found only if the subscriber is in the list of friends predefined by the person.

2. The method of claim 1, wherein the location of the subscriber is received via a global positioning system transmitter on a mobile endpoint device of the subscriber.

3. The method of claim 1, wherein the location is received on a periodic basis.

4. The method of claim 1, wherein the finding comprises:
   identifying different subscribers within the range of the location;
   receiving personal information from the different subscribers within the range of the location of the subscriber; and
   matching the characteristic predefined by the subscriber with a characteristic in the personal information of one of the different subscribers.

5. The method of claim 1, wherein the finding is performed within a predefined location.

6. The method of claim 1, wherein the finding is performed continuously.

7. The method of claim 1, further comprising:
   providing a visual display on a mobile endpoint device of the subscriber of where the person is located relative to the location of the subscriber.

8. A non-transitory computer-readable medium having stored thereon a plurality of instructions, the plurality of instructions including instructions which, when executed by a processor, cause the processor to perform a method for finding a person, comprising:
   receiving a request from a subscriber to find the person having a characteristic predefined by the subscriber;
   receiving a location of the subscriber;
   finding the person having the characteristic predefined by the subscriber within a range of the location of the subscriber if the subscriber is in a list of friends predefined by the person; and
   notifying the subscriber that the person was found only if the subscriber is in the list of friends predefined by the person.

9. The non-transitory computer-readable medium of claim 8, wherein the location of the subscriber is received via a global positioning system transmitter on a mobile endpoint device of the subscriber.

10. The non-transitory computer-readable medium of claim 8, wherein the location is received on a periodic basis.

11. The non-transitory computer-readable medium of claim 8, wherein the finding comprises:
    identifying different subscribers within the range of the location;
    receiving personal information from the different subscribers within the range of the location of the subscriber; and
    matching the characteristic predefined by the subscriber with a characteristic in the personal information of one of the different subscribers.

12. The non-transitory computer-readable medium of claim 8, wherein the finding is performed within a predefined location.

13. The non-transitory computer-readable medium of claim 8, wherein the finding is performed continuously.

14. The non-transitory computer-readable medium of claim 8, further comprising:
    providing a visual display on a mobile endpoint device of the subscriber of where the person is located relative to the location of the subscriber.

15. An apparatus for finding a person, comprising:
    a processor; and
    a computer-readable medium in communication with the processor, wherein the computer-readable medium has stored thereon a plurality of instructions, the plurality of instructions including instructions which, when executed by the processor, cause the processor to perform a method, comprising
    receiving a request from a subscriber to find the person having a characteristic predefined by the subscriber;
    receiving a location of the subscriber;
    finding the person having the characteristic predefined by the subscriber within a range of the location of the subscriber if the subscriber is in a list of friends predefined by the person; and
    notifying the subscriber that the person was found only if the subscriber is in the list of friends predefined by the person.

16. The apparatus of claim 15, wherein the location of the subscriber is received via a global positioning system transmitter on a mobile endpoint device of the subscriber.

17. The apparatus of claim 15, wherein the location is received on a periodic basis.

18. The apparatus of claim 15, wherein the finding comprises:
    identifying different subscribers within the range of the location;
    receiving personal information from the different subscribers within the range of the location of the subscriber; and
    matching the characteristic predefined by the subscriber with a characteristic in the personal information of one of the different subscribers.

19. The apparatus of claim 15, wherein the finding is performed within a predefined location.

20. The apparatus of claim 15, further comprising:
    providing a visual display on a mobile endpoint device of the subscriber of where the person is located relative to the location of the subscriber.

* * * * *